United States Patent [19]
Kish et al.
[11] 3,714,639
[45] Jan. 30, 1973

[54] TRANSFER OF MAGNETIC DOMAINS IN SINGLE-WALL DOMAIN MEMORIES

[75] Inventors: Donald Eugene Kish, North Plainfield; James Lanson Smith, Bedminster, both of N.J.
[73] Assignee: Bell Telephone Laboratories, Incorporated, Murray Hill, N.J.

[22] Filed: Dec. 6, 1971
[21] Appl. No.: 205,075

[52] U.S. Cl. ........................340/174 TF, 340/174 SR
[51] Int. Cl...........................G11c 11/14, G11c 19/00
[58] Field of Search ................................340/174 TF

[56] References Cited

UNITED STATES PATENTS 3,613,058 10/1971 Bonyhard et al................340/174 TF
3,618,054 11/1971 Bonyhard et al................340/174 TF

OTHER PUBLICATIONS

IBM Technical Disclosure Bulletin "Improvement of Data Rate In Cylindrical Domain Devices," by Genovese, Vol. 13, No. 11, 4/71, p. 3299–3300.

*Primary Examiner*—Stanley M. Urynowicz, Jr.
*Attorney*—R. J. Guenther et al.

[57] ABSTRACT

A magnetic arrangement for transferring a single-wall domain in a layer of magnetic material from one closed loop to another, both defined by magnetically soft elements includes a transfer conductor oriented to supply fields operative both to move a domain from its present position in one loop into a transfer region and to eliminate the attracting field generated in the next normal position for the domain in response to a magnetic field reorienting in the plane of the layer. The position to which the domain is moved in the transfer region is defined by a magnetically soft guide element.

17 Claims, 3 Drawing Figures

TRANSFER OF MAGNETIC DOMAINS IN SINGLE-WALL DOMAIN MEMORIES

FIELD OF THE INVENTION

This invention relates to data processing arrangements and more particularly to such arrangements in which information is stored as patterns of single-wall domains.

BACKGROUND OF THE INVENTION

U.S. Pat. No. 3,618,054 of P. I. Bonyhard, U. F. Gianola, and A. J. Perneski, issued Nov. 2, 1971, discloses a single-wall domain mass memory organization in which a plurality of parallel closed loop channels and a single vertical closed loop channel for moving single-wall domains are defined by periodic patterns of magnetically soft overlay elements coupled to a layer of magnetic material in which the domains move. A magnetic field rotating in the plane of that layer generates in the elements pole patterns which change as the field orientation changes. The changing pole patterns produce field gradients which cause domain movement in the various channels in a synchronous manner due to the periodic arrangement of the elements.

A single read-write area is defined for the entire layer. That area coincides with a selected portion of the vertical loop commonly termed the "major" loop. Consequently, a selected binary word, represented by a domain pattern is transferred from the parallel loops, termed "minor" loops, to the major loop for recirculation past the read-write area.

A binary word in this arrangement conveniently comprises a bit from each minor loop. Therefore, when transfer to the major loop occurs, a "vacancy" is formed in the originating position in each of the minor loops. By a judicious choice in the relationship between the number of minor loops and the number of stages both in the major loop and the minor loops, information may be returned to those vacancies merely by a return transfer operation an appropriate number of cycles of the in-plane field after the initial transfer operation occurs. In this mode of operation, the major loop functions as a temporary store and the minor loops function as permanent stores.

The transfer operations are performed where the minor loops are most closely spaced from associated stages of the major loop. Typically, a transfer operation is in response to a pulse in an electrical conductor which couples all the transfer positions to effect parallel transfer of the entire binary word. The fields generated by the pulse function to modify the field gradients operative on the domains of the selected word to change the destination of a domain at each transfer position at a particular point in the cycle of the in-plane field. It is desirable to modify the geometry of the magnetically soft elements as little as possible from that which exhibits optimum loop propagating margins in order to avoid reducing those margins. Consequently, the efficiency of the transfer operation depends on the effectiveness of the transfer conductor in generating the appropriate transfer fields when pulsed.

In our copending patent application Ser. No. 128,889 filed Mar. 29, 1971, we describe a transfer position for such a mass memory. The position is defined by magnetically soft guide elements coupled to a vertically disposed transfer conductor operative to generate magnetic poles in, and thus move a domain across each guide element when pulsed.

BRIEF DESCRIPTION OF THE INVENTION

The present invention is based on the recognition that a hairpin-shaped transfer conductor which is disposed at each transfer position at an angle to both the major and minor loop axes there, produces, when pulsed, a field antiparallel to the magnetization of a domain in a position to counter the normal field gradients produced by the in-plane field plus a strong field parallel to the magnetization of a domain in a position for causing domain transfer.

In one embodiment of this invention a magnetically soft "dollar-sign" shaped guide element is employed at each transfer position with a curved geometry having a center and first and second portions adjacent an originating and a receiving channel or path, respectively. A pulse on the transfer conductor produces a strong attracting field at the center of the guide element and eliminates the effect of the poles generated during the next orientation of the in-plane field in the originating channel. The guide element geometry is adapted to exhibit attracting poles in the second portion thereof for this next orientation of the in-plane field.

The phase relationship between the transfer pulse and the in-plane field determines the direction of transfer of the domain.

DETAILED DESCRIPTION

Figure 1:
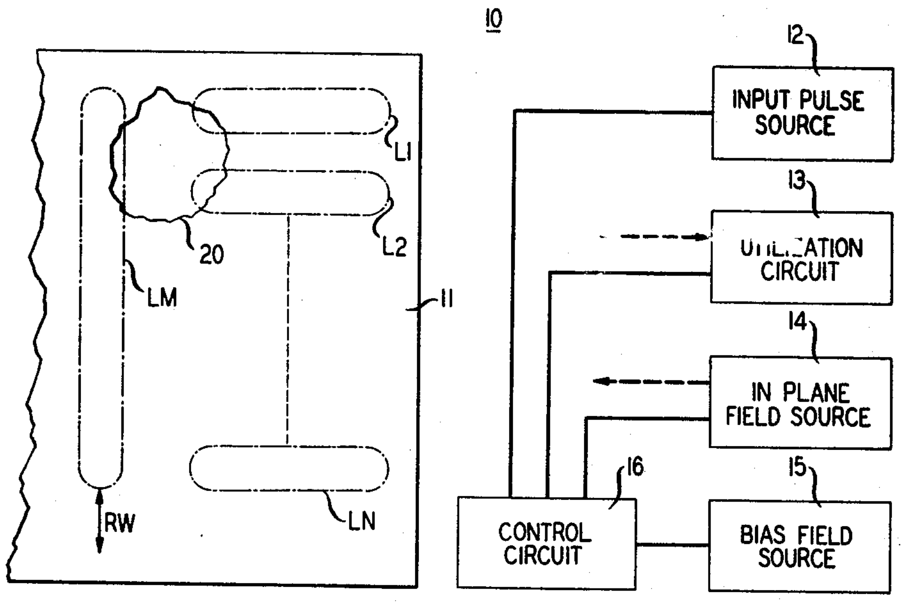
FIG. 1 is a line diagram of a single-wall domain memory.

FIG. 1 shows a single-wall domain memory organization 10 comprising a layer 11 of material in which single-wall domains can be moved. The movement of domain patterns in layer 11 is defined by a periodic pattern of elements of magnetically soft material, typically deposited by photolithographic techniques as an overlay on a suitable spacing layer (not shown) on the surface of layer 11. The elements are of geometries and so disposed with respect to one another to exhibit moving pole patterns in response to a rotating in-plane magnetic field and are inoperative to propagate domains in parallel in closed "minor" loops represented by the oval-shaped loops designated merely L1 through LN for convenience.

The overlay elements also define a single "major" loop shown as a vertically oriented oval-shaped loop LM in FIG. 1. It is well known, that information is recirculated in the minor loops for transfer of selected data therein to the major loop. The data thereafter is advanced to a read-write position in the major loop, designated by double-headed arrow RW in FIG. 1, prior to the return of the selected data to associated vacancies created in the minor loop by the initial transfer. The information in the major loop as well as in the minor loops is moved responsive to the in-plane field rotations and thus is synchronized by that field so that selected data is returned to the original positions in minor loops simply by the occurrence of a data return transfer operation at the appropriate number of field rotations after an initial data transfer operation.

An input pulse source represented by block 12 in FIG. 1 and a utilization circuit represented by block 13 are coupled to the read-write position for operation as described in the above-mentioned patent. An in-plane field source is represented by block 14 in FIG. 1. In practice, a magnetic bias field represented by block 15 in FIG. 1, maintains domains in layer 11 at a specified diameter as is well known. Sources 12, 14, and 15, and circuit 13 are connected to a control circuit represented by block 16 in FIG. 1 for synchronization and activation. The various sources and circuits may be any such elements capable of operating in accordance with this invention.

Figure 2:
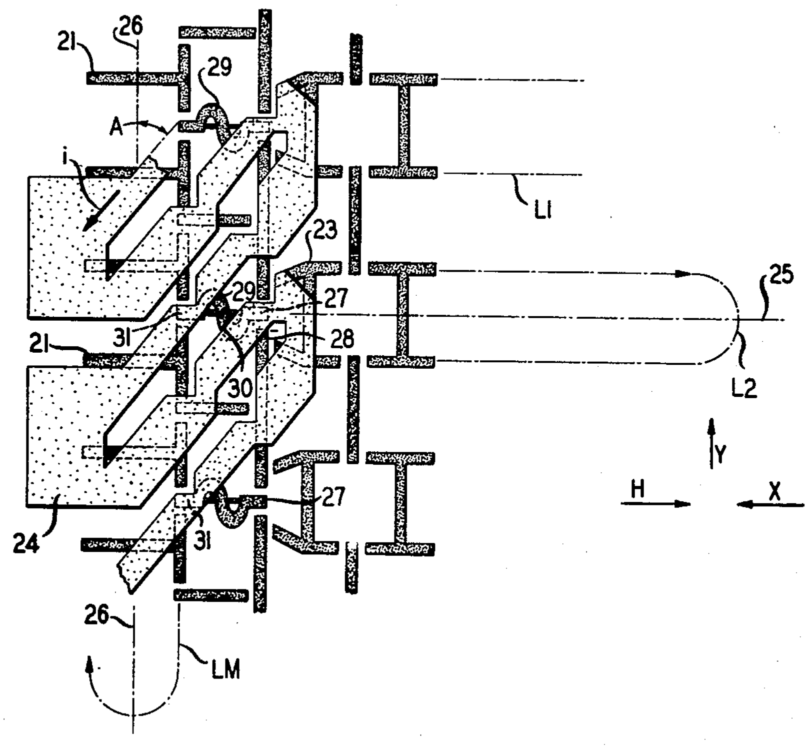
FIGS. 2 and 3 are schematic representations of a portion of the memory of FIG. 1.

The transfer of information in such an arrangement occurs at transfer positions defined by magnetically soft elements in the region where each minor loop is most closely spaced from an associated stage of the major loop. A representative transfer region is located at 20 in FIG. 1 and shown in detail in FIGS. 2 and 3. The elements 21, in FIG. 2, form part of the major loop LM indicated by the broken vertical arrow so designated in FIG. 2. The element 23 forms a part of the representative minor loop L2 as indicated by the broken arrow so designated. The transfer position includes these loop-defining elements plus the serpentine (or dollar-sign shaped) element therebetween as shown in FIG. 2. The transfer region also includes an electrical conductor 24 which is oriented at an angle A (viz: 45°) to the axes 25 and 26 of minor loop L2 and major loop LM in FIG. 2. The angle A is chosen to maximize the field gradient for a domain in the transfer direction and to minimize the poles in the normal propagate direction as will become clear.

In an illustrative operation, a domain moves counterclockwise around loop L2 as the in-plane field rotates counterclockwise. When the field is oriented to the right as indicated by the arrow H in FIG. 2, a domain occupies a position 27 in loop L2. The next normal position in loop L2 is position 28 attained when the in-plane field next rotates to an upward position.

A transfer operation occurs by pulsing conductor 24 while the selected domain occupies position 27. The polarity of the pulse applied is such as to generate a field parallel to the magnetization of a domain in the region of position 30 in FIG. 2. If we assume that a domain has its magnetization directed upward (viz: positive (+) along a Z axis) out of layer 11 in FIG. 1, then the current in the conductor is in the direction of arrow *i* in FIG. 2. If the pattern of magnetically soft elements separates the planes of conductor 24 and layer 11, the field generated by the pulse in the conductor has field components X and Y (and Z) effective on the elements as indicated by the arrows so designated in FIG. 2 directed to the left and upwards (and by the + sign), respectively. The X component is operative to produce poles tending to move a domain to the left as viewed in FIG. 2.

Figure 3:
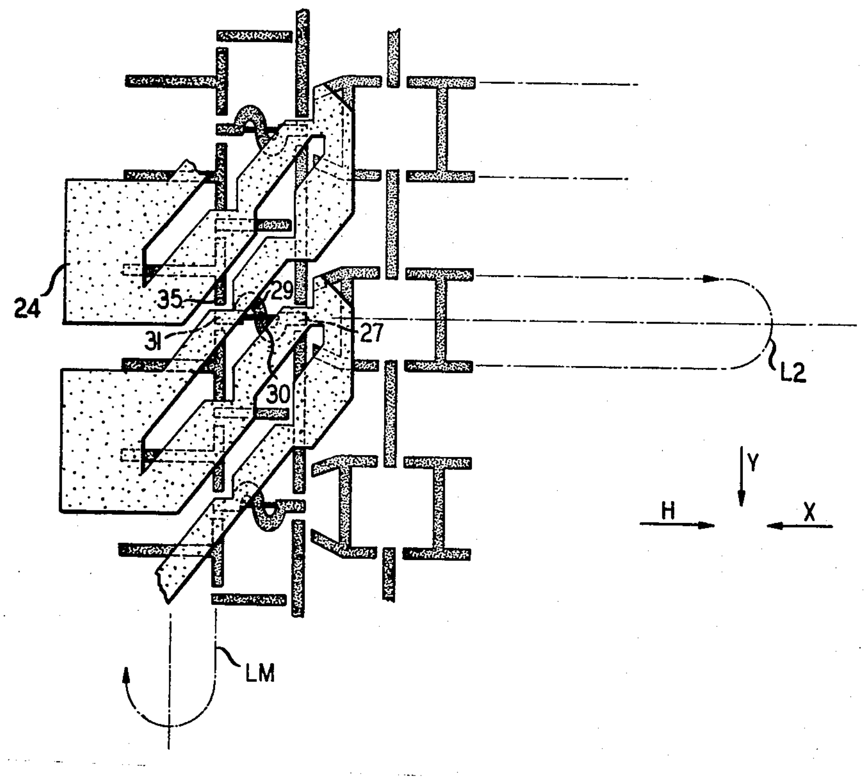

The in-plane field rotates to an upward direction while the transfer pulse is applied thus generating attracting poles at position 28 in FIG. 2 and along the top of the guide element at position 29 in FIGS. 2 and 3. But the Z component of the transfer pulse cancels the field generated by the attracting pole generated at position 28 by the in-plane field as indicated by the minus signs there and the Y component enhances the pole strength in the portion of the guide element between positions 29 and 30. Thus, a domain moves from position 27 to position 30 and then along the portion of the serpentine element between positions 30 and 31. The pulse on conductor 24 is terminated as the in-plane field is next directed to the left, the domain completing its movement to position 31, in FIG. 2, at this juncture under the influence of the rotating field.

It is important to note that in the absence of a transfer pulse in conductor 24, a domain moves from position 27 to position 28 when the in-plane field rotates from a rightward direction to an upward direction. If a transfer operation occurs, the Z component of the transfer field is antiparallel to the field produced by the downward directed in-plane field and thus cancels the effect of the poles generated by the in-plane field at position 28. Accordingly, the angular disposition of conductor 24 with respect to the axes of the major and minor loops is chosen so that the fields produced thereby alter the normal progression of field changes for moving domains in a loop without modifying the normal geometry of the magnetically soft elements which define that loop. At the same time, the transfer conductor, when pulsed, supplied the requisite field (viz: positive field along the Z axes) for displacing a domain during a transfer operation aided by the X component of the field.

A domain in position 31 is in a normal position for movement counterclockwise in major loop LM as is clear from the figure.

A return transfer operation occurs when a domain in loop LM occupies position 31 in FIG. 3 for an in-plane field orientation to the left as viewed in the figure. The next normal position for the domain in loop LM is position 35 for an in-plane field directed downward. A return transfer pulse in conductor 24 at this juncture, generates a field to attract domains to the right from position 31. The X component of the transfer pulse field generates pole patterns in the serpentine element to displace a domain to the right. The Z component of that field also cancels the effect of attracting poles generated by the in-plane field at position 35 and constitutes a strong attracting field at position 31 as before. As a consequence, a domain moves across the serpentine (dollar-sign shaped) element arriving at positions 30 and 27 when the in-plane field is next directed downward and then to the right as indicated by the arrow H in FIG. 3. It is helpful to recall that position 27 is a normal position in minor loop L2. Thus, transfer both to the major loop and back to the minor loop has now been shown.

Of course, the transfer region between each minor loop and an associated stage of the major loop includes a serpentine or dollar-sign shaped guide element and conductor 24. Therefore, the field components generated in response to a pulse on conductor 24 are operative in each of the transfer positions to transfer a domain, a binary one, or the absence of a domain, a binary zero. All the information transferred, during one operation comprises a binary word for sequential read out or for replacement at the read-write position RW of FIG. 1 as the in-plane field continues to rotate.

The shape of the guide element in the transfer region is designed to produce a set of favorable poles for domain movement due to the in-plane field only in the portion of the guide element from the center to the channel to which the domain is being transferred. No favorable poles are produced in the portion of the guide element between the channel from which the domain is being transferred and the center. This arrangement operates with the transfer current pulse applied only until the domain is moved to the center of the guide element. After the domain is at the center, the rotating field completes the transfer. The absence of favorable poles in that portion of the guide element adjacent the transferring channel reduces the chance of uncontrolled transfer.

The interconnection of a series of hairpin-shaped transfer conductors electrically in series, moreover, provides an additional benefit. The interconnection results in hairpin geometries between the transfer hairpin geometries where the transfer pulse generates a strong negative field in the Z direction. The alignment of these negative fields with, for example, positions 28 of FIG. 2 results in the inhibition of the attractive field normally generated there by the in-plane field as mentioned above.

In one example of a transfer position in accordance with this invention, a major-minor mass memory was defined by magnetically soft elements as shown in FIG. 2. The elements were nominally 5 × 30 microns on 40-micron centers for moving domains eight microns in diameter in a 5-micron thick layer of garnet. A bias field of 100 oersteds maintained the domains at a specified diameter. An in-plane field of 30 oersteds was rotated at 25 kilocycles and a transfer pulse having an amplitude of 50 milliamperes and a duration of 10 micro sec. was applied as described in connection with FIGS. 2 and 3.

What has been described is considered merely illustrative of the principles of this invention. Therefore, various modifications can be devised by those skilled in the art in accordance with those principles within the spirit and scope of this invention.

What is claimed is:

1. A magnetic arrangement comprising a layer of material in which single-wall domains can be moved, a pattern of magnetically soft elements for defining first and second propagation paths for moving domains along first and second axes, respectively, in response to a magnetic field reorienting in the plane of said layer, said paths being most closely spaced at a transfer position, an electrical conductor coupled to said layer at said transfer position at an acute angle to both said first and second axes, and a magnetically soft guide element having a center and first and second portions associated with said first and second paths, respectively, for defining a transfer path between said first and second paths, said conductor having a geometry to generate when pulsed a magnetic field for moving a domain from a first position in said first path to said center, said guide element having a geometry to generate a magnetic field to move a domain to said second portion when said in-plane field reorients to a next consecutive direction to move a domain from said first to a second position in said first path.

2. A magnetic arrangement in accordance with claim 1 wherein said first and second paths are of closed loop geometry for recirculating domains thereabout.

3. A magnetic arrangement in accordance with claim 2 wherein said in-plane field reorients by rotation and said guide element has a dollar-sign geometry.

4. A magnetic arrangement in accordance with claim 3 wherein said conductor has a hairpin geometry for generating a field for attracting a domain to a position at said center of said guide element when pulsed.

5. A magnetic arrangement in accordance with claim 4 wherein said pattern defines a first and a plurality of said second paths defining a plurality of said transfer positions therebetween, each of said transfer positions including a dollar-sign-shaped guide element, said conductor coupling said layer at said transfer positions electrically in series.

6. An arrangement comprising a layer of material in which single-wall domains can be moved, a pattern of elements for defining in said layer first and second paths for moving single-wall domains along first and second axes in the plane of said layer in response to a reorienting in-plane field, said pattern also defining a transfer region between said first and second paths, each of said first and second paths including first and second consecutive positions for a domain for said field oriented in first and second directions, respectively, a conductor coupled to said layer at said transfer region, said conductor being of a geometry and being disposed to generate when pulsed both a field for moving a domain from said first position in said first path into said transfer region and a field for repelling a domain from the associated second position, said transfer region including a guide element with a center and first and second portions associated with said first and second paths, respectively, to provide a field to move a domain to said second portion in response to an in-plane field in said second direction.

7. An arrangement in accordance with claim 6 wherein said conductor has a hairpin geometry and is disposed to generate at said center a field parallel to the magnetization of a domain and to generate at said associated second position a field antiparallel to the magnetization of a domain.

8. An arrangement in accordance with claim 7 wherein said pattern defines a plurality of first paths and a single second path with a plurality of transfer regions therebetween, said conductor at each of said regions being connected electrically in series with the conductors at the others of said regions.

9. An arrangement in accordance with claim 7 wherein said conductor is disposed at an angle to said first and second axes.

10. An arrangement in accordance with claim 8 wherein said conductors are disposed at an angle to said first and second axes.

11. An arrangement in accordance with claim 10 wherein said guide element at each of said transfer regions has a dollar-sign shape having a center and said conductor couples said layer at said center.

12. An arrangement in accordance with claim 11 also including means for providing said reorienting in-plane field and means for pulsing said conductor at a time when said field is in an orientation such that domains in response thereto occupy said selected first positions.

13. An arrangement in accordance with claim 12 wherein said conductors also couple said associated second positions to provide said antiparallel field there when pulsed.

14. An arrangement in accordance with claim 13 wherein each of said first and second plurality of second paths is of closed loop geometry for recirculating information thereabout.

15. An arrangement in accordance with claim 13 also including means responsive to a first signal for providing in said conductor a sequence of pulses timed with respect to said reorienting in-plane field for transferring a domain pattern from said second paths to said first path and back again.

16. An arrangement in accordance with claim 9 wherein said conductor is adapted to provide a field anti-parallel to the magnetization of a domain in each of said second positions when pulsed.

17. An arrangement comprising a layer of magnetic material in which single-wall domains can be moved, means for moving domains in first and second paths through a sequence of a first and a second position in each of said paths responsive to a magnetic field reorienting in the plane of said layer, transfer means for selectively transferring a domain from said first position of said first path to said first position of said second path, said transfer means comprising a guide element having a center and first and second portions associated with said first and second paths respectively and a conductor, said conductor being so disposed and of a geometry to provide both a field for moving a domain to said center and a field to repel a domain from said second position of said first path when pulsed at a time said in-plane field moves to a first orientation for moving a domain from said first to said second position in said first path, said guide element being of a geometry to attract a domain to said second portion in response to said in-plane in said first orientation.

* * * * *